United States Patent
Aihara et al.

[11] Patent Number: 6,054,187
[45] Date of Patent: Apr. 25, 2000

[54] METHOD OF MANUFACTURING A BORON CARBIDE FILM ON A SUBSTRATE

[75] Inventors: Yasufumi Aihara; Shinji Kawasaki, both of Nagoya; Shigenori Ito, Kasugai, all of Japan

[73] Assignee: NGK Insulators, Ltd., Nagoya, Japan

[21] Appl. No.: 09/210,110

[22] Filed: Dec. 11, 1998

[30] Foreign Application Priority Data

Dec. 15, 1997 [JP] Japan ................................. 9-362486
Oct. 6, 1998 [JP] Japan ................................ 10-297598

[51] Int. Cl.[7] ............................... C23C 4/10; C23C 4/18

[52] U.S. Cl. ........................................ 427/450; 427/372.2

[58] Field of Search ................................. 427/450, 372.2

[56] References Cited

U.S. PATENT DOCUMENTS

| 4,175,611 | 11/1979 | Fletcher | 164/418 |
| 4,675,205 | 6/1987 | Boncoeur et al. | 219/76.16 |
| 5,435,889 | 7/1995 | Dietrich | 216/63 |

FOREIGN PATENT DOCUMENTS 5-339079 12/1993 Japan.
7-33567 2/1995 Japan.

Primary Examiner—Katherine A. Bareford
Attorney, Agent, or Firm—Wall Marjama Bilinski & Burr

[57] ABSTRACT

A method of forming a film of boron carbide on a substrate is provided, which comprises the steps of forming the boron carbide film on a surface of a substrate by plasma spraying, and heating the film at 1100~2400° C. in a non-oxidizing atmosphere, whereby boron oxide contained in the boron carbide film is removed.

7 Claims, 3 Drawing Sheets

FIG_4
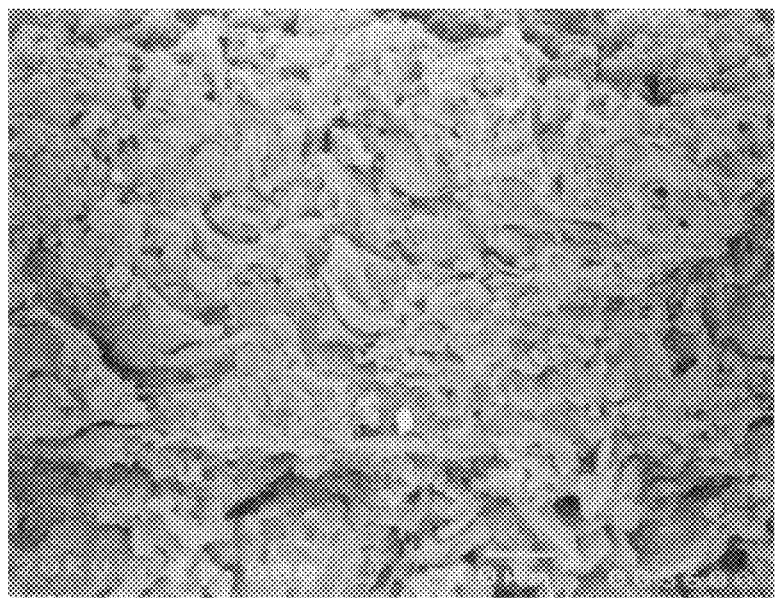
FIG_5
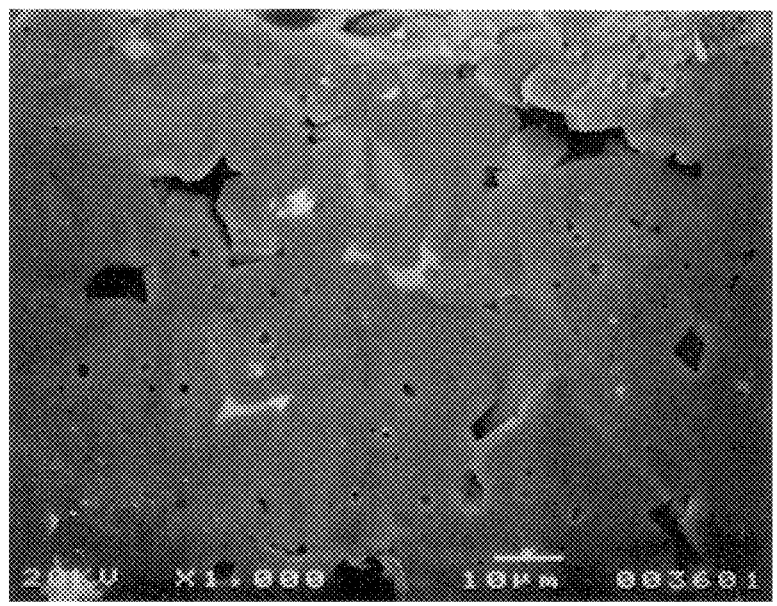

METHOD OF MANUFACTURING A BORON CARBIDE FILM ON A SUBSTRATE

BACKGROUND OF THE INVENTION

(1) Field of the Invention

This invention relates to a method of forming a film of boron carbide on a substrate, and more particularly the invention relates to a method of manufacturing a composite material with a film of boron carbide that is effectively capable of being used as an abrasion-resisting material, a sliding-material, a heat-resisting tile in a rocket and the like, and a control material, a shield material, etc. in a nuclear reactor and so on.

(2) Related Art Statement

Boron carbide has a very high melting point, so it has good heat-resistance. It has also chemical stability, so it has good oxidation-resistance. Moreover it has good mechanical strength such as abrasion-resistance, and hardness, and high neutron absorbability.

Materials covered with boron carbide, therefore, have been conventionally used as a abrasion-resisting material, a sliding material such as for inner surfaces of sandblasting nozzles and a crushing machine, a heat-resisting tile in rocket, and control-material and a shield-material in the nuclear reactor.

The material is generally covered with boron carbide by CVD, plasma spraying or the like.

When the boron carbide film is, however, formed on the substrate material by the above plasma spraying, the film is disadvantageously cracked or peeled off.

To solve the above problems, Japanese patent Laid-open No. 5-339079 shows a method in which a surface of a carbonaceous material as a substrate is converted into boron carbide, powdery boron carbide is put on a converted layer of boron carbide or a layer of boron carbide is formed on a surface of the substrate by CVD or the like, and finally the resulting substrate is hot-pressed to form a dense boron carbide film.

Moreover Japanese patent Laid-open No. 7-33567 discloses a method in which secondary quasi-particles with 3~50 μm in diameter are prepared by cohering fine particles of nitride or carbide with 0.01~1 μm in diameter, and coated onto a surface of a carbonaceous material as a substrate by plasma spraying, and at least one layer of a metal, an alloy, an oxide-based ceramics or a non-oxide type ceramics is laminated upon the resulting substrate by spraying.

However, the above methods cannot sufficiently prevent cracking and peeling-off of the boron carbide film coated on the substrate, and this tendency becomes conspicuous particularly under a high humidity condition. So the boron carbide film cannot have the characteristics such as heat-resistance and abrasion-resistance which are unique to boron carbide.

SUMMARY OF THE INVENTION

It is an object to provide a method of forming a film of boron carbide which is not cracked or peeled off from a substrate.

This invention relates to a method of forming a boron carbide film on a substrate, comprising the step of forming a film of boron carbide on a surface of a substrate by plasma spraying, and removing boron oxide in the plasma sprayed film by heating the film at 1100~2400° C. in a non-oxidative atmosphere.

This invention also relates to a method of manufacturing a composite material comprising the steps of: preparing a substrate, forming a film of boron carbide on a surface of a substrate by plasma spraying, and removing boron oxide in the plasma sprayed film by heating the film at 1100~2400° C. in a non-oxidative atmosphere.

This invention relates to a composite material comprising a substrate and a film of boron carbide integrally formed on a surface of a substrate by plasma spraying, wherein the boron carbide film contains substantially no boron oxide.

The present inventors investigated in detail the causes of cracking and peeling-off from the substrate of a boron carbide film in the case of forming the boron carbide ($B_4C$) film on the substrate by plasma spraying. Consequently, they found that the above cracking, etc. are due to boron oxide ($B_2O_3$) mixed into the film.

Namely, for example, when a film of boron carbide is formed on a surface of a substrate by plasma spraying, surfaces of melt particles are oxidized with oxygen in a spraying atmosphere, whereby the oxidized boron is incorporated into the film. Boron oxide is hygroscopic, so that in the case of leaving the film in air, it expands through a reaction with moisture.

As a result, the film of boron carbide is fractured, cracked, and/or peeled off from the substrate.

This invention is based on the above discovery.

According to the method of forming a boron carbide film in this invention, the boron carbide film can be produced without being cracked or peeled off.

When a film of boron carbide is to be formed by plasma spraying, powdery boron carbide is melted during the spraying, and partly decomposed into boron (B) and carbon (C) as shown by the following equation (1).

$$B_4C \rightarrow 4B+C \qquad (1)$$

Since the boron is at a high temperature in spraying, it immediately reacts with oxygen in air, thereby forming boron oxide as shown in the following equation (2).

$$4B+3O_2 \rightarrow 2B_2O_3 \qquad (2)$$

On the other hand, a part of the sprayed carbon remains in the resulting film, and the rest is scattered out through the formation of carbon monoxide upon reacting with oxygen in the following equation (3).

$$2C+O_2 \rightarrow 2CO \qquad (3)$$

In a conventional method of manufacturing a boron carbide film, therefore, a layer "b" (boron oxide+carbon) of boron oxide and the remaining carbon is formed on the surface of a sprayed boron carbide liquid particle "a" as shown in FIG. 1.

As shown in FIG. 2, when these liquid particles are knocked against the surface of the substrate "d" in the state that the particles are liquid, the sprayed boron carbide film "c" takes a stacking structure through being cooled due to a large amount of boron oxide contained therein.

In the method of forming the boron carbide film on the substrate according to this invention, after the boron carbide film is formed by plasma spraying, the film is heated at a high temperature of 1100~2400° C. in a non-oxidative atmosphere, whereby the boron oxide reacts with the remaining carbon to generate boron carbide and carbon monoxide, which vanishes as shown in equation (4).

$$2B_2O_3+7C \rightarrow B_4C+6CO \qquad (4)$$

Thus, according to this invention, the boron oxide can be removed from the boron carbide film formed as above mentioned, so that the expansion and the occurrence of cracking of the boron carbide film can be prevented.

BRIEF DESCRIPTION OF THE DRAWINGS

For a better understanding of the invention, reference is made to the attached drawings, wherein:

FIG. 4 is an electron microscope photograph of a fractured surface of the boron carbide film formed by a conventional manufacturing method.

FIG. 5 is an electron microscope photograph of a fractured surface of a film of boron carbide formed by the forming method according to this invention.

DESCRIPTION OF THE PREFERRED EMBODIMENTS

Figure 1:
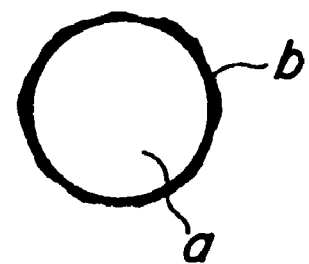
FIG. 1 shows the state of the plasma sprayed liquid particle formed by a conventional method.
Figure 2:
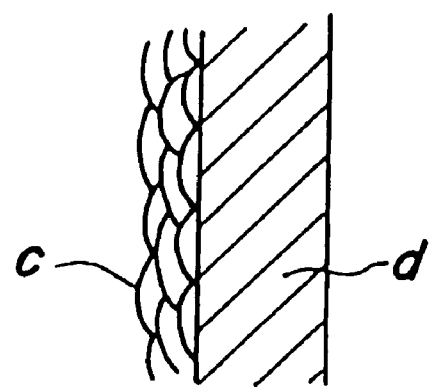
FIG. 2 shows the state of the film of boron carbide formed by a conventional method.

A method of forming a film of boron carbide on a substrate according to this invention is described in more detail hereinafter.

A substrate in this invention is required to have thermal shock-resistance to prevent its destruction due to plasma spraying. Moreover it requires a coefficient of thermal expansion equal to or larger than that of boron carbide to prevent the occurrence of cracks in the boron carbide film when the resulting substrate is cooled after the heat treatment of the present invention.

The lower limit of the coefficient of thermal expansion is preferably $4.5\times10^{-6}$/degree and particularly $5.5\times10^{-6}$/degree in a range of room temperature to 1000° C. If the coefficient of thermal expansion is smaller than $4.5\times10^{-6}$/degree, tensile stress is exerted upon the boron carbide film from the substrate as the resulting substrate is cooled after heat treatment hereinafter. Consequently, the film tends to be cracked and peeled off from the substrate, disadvantageously.

The upper limit of the coefficient of thermal expansion of the substrate is $7\times10^{-6}$/degree and particularly $6\times10^{-6}$/degree in a range of room temperature to 1000° C. If the coefficient of thermal expansion is larger than $7\times10^{-6}$/degree the compressive stress is exerted upon the boron carbide film from the substrate as the resulting substrate is cooled after heat treatment, different from the above case. Consequently, the film tends to be peeled-off from the substrate disadvantageously.

As the material satisfying the above requirements, for example, carbon (C), recrystallized silicon carbide (SiC), a silicon (Si)-silicon carbide (SiC) composite material, mullite, and aluminum nitride (AlN) may be given. Considering thermal shock-resistance, carbon, recrystallized silicon carbide, and the silicon-silicon carbide composite are preferably used.

The boron carbide film can be formed by well-known plasma spraying such as atmospheric plasma spraying, plasma-jet, or low pressure plasma spraying.

The lower limit thickness of the boron carbide film is preferably 20 $\mu$m and more particularly 50 $\mu$m. If the thickness of the boron carbide film is smaller than 20 $\mu$m, characteristics including the heat-resistance and oxidation-resistance, which are peculiar in the boron carbide, cannot be afforded to the substrate.

Meanwhile, the upper limit thickness of the boron carbide film is preferably 500 $\mu$m and particularly 100 $\mu$m. Even if the thickness of the boron carbide film is larger than 500 $\mu$m, the peculiar characteristics of the boron carbide are saturated and the source of the boron carbide is simply wasted, and the silicon carbide film tends to be cracked due to the mismatch in coefficients of thermal expansion between the substrate and the boron carbide film.

In this invention, as shown in the above equation (2), to remove the boron oxide generated by the oxidation of the decomposed boron, the boron carbide film formed by plasma spraying requires the heat treatment in the non-oxidative atmosphere.

Moreover as mentioned above, to remove the boron oxide incorporated into the boron carbide film through evaporation by the reaction of the equation (4), it is required that the lower limit temperature in the heat treatment is 1100° C. In order to effectively remove the boron oxide inside the film even if the film of boron carbide is thick, it is required that the lower limit temperature in the heat treatment is preferably 1300° C.

Moreover to prevent the destruction of the substrate due to the heat treatment of the substrate, it is required that the upper limit temperature in the heat treatment is 2400° C., preferably 2000° C., more preferably 1600° C.

The heat treatment in the method of forming the boron carbide film according to this invention is concretely performed as follows.

First, a substrate on which a boron carbide film is formed by plasma spraying is set in an equipment such as a high temperature atmospheric furnace. Next, after the equipment is evacuated by a vacuum pump, a non-oxidative gas such as nitrogen ($N_2$), helium (He), or argon (Ar) is charged into the equipment.

Subsequently after the substrate is heated to a given temperature in this invention at a rate of 3~15 degrees/min, it is held at this temperature for 1~10 hours. Afterward it is cooled down to 200° C. or less inside the equipment, and the substrate formed with the boron carbide film is taken out from the equipment.

In the above-mentioned method, the formation of the boron carbide by plasma spraying and the heat treatment in the non-oxidative atmosphere are performed in different batches. In addition, the manufacturing method according to the present invention can be performed in an in-line system using an equipment with plasma spraying and heat treatment functions.

The composite material according to the present invention comprises a substrate and a film of boron carbide integrally formed on a surface of a substrate by plasma spraying, wherein the boron carbide film contains substantially no boron oxide. The wording "the film contains substantially no boron oxide" is not intended to completely exclude a case where the film contains any amount of boron oxide, but boron oxide may be contained in the film so long as this boron oxide does not cause such cracking and/or peeling off of the film from the substrate that would produce unacceptable damage.

Figure 3:
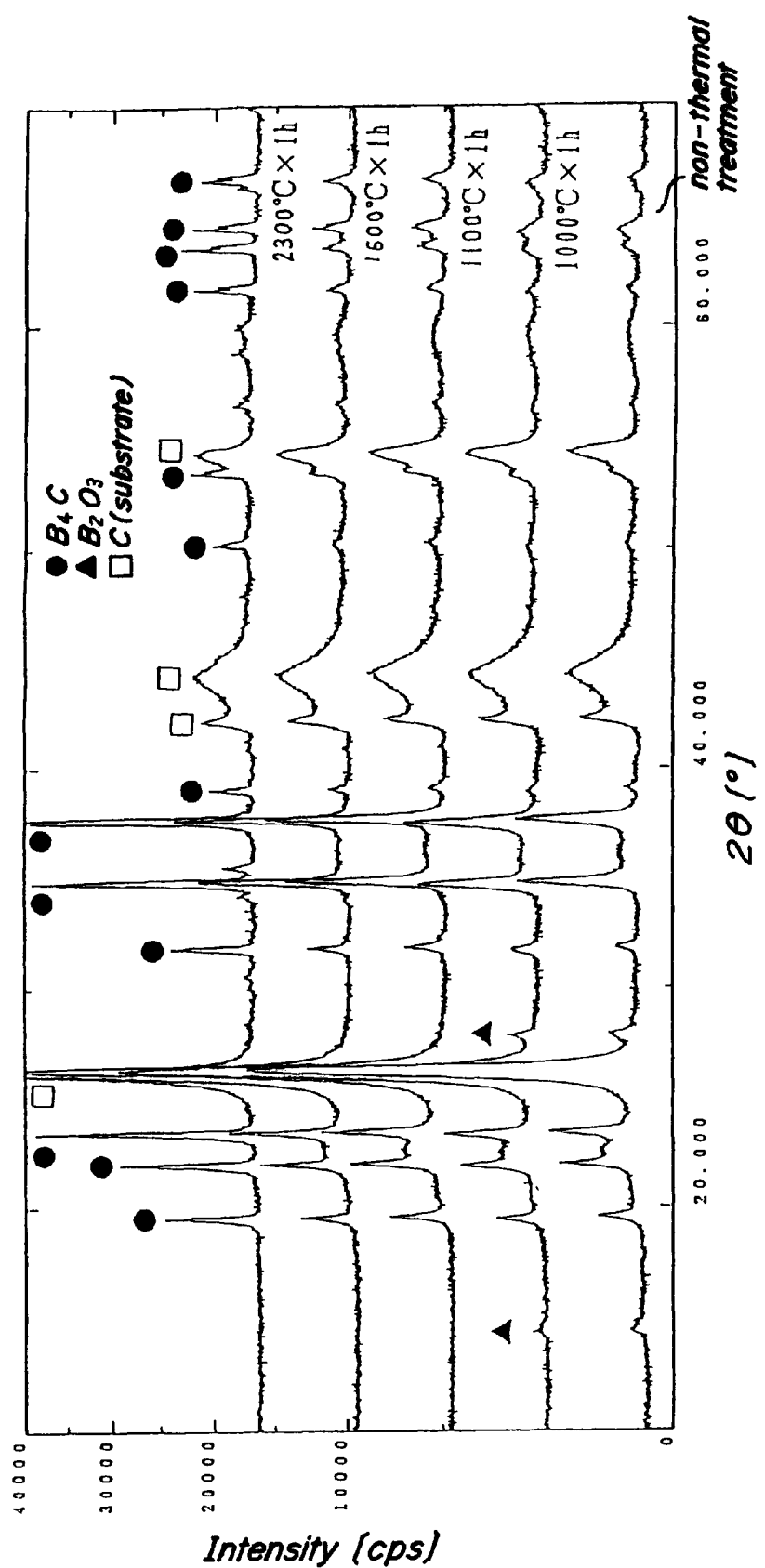
FIG. 3 is an X ray diffraction peak pattern showing the relation of the heating temperature to the crystalline phase.

FIG. 3 is an X ray diffraction peak pattern showing the relation between the temperature of the heat treatment and the crystalline phase.

With the conventional boron carbide film-producing process having no heat treatment, peaks of a film of boron carbide having undergone no heat treatment in FIG. 3 appear at $2^\theta=35.0$ degree ($B_4C$), 37.8 degrees, etc., for boron carbide, at $2^\theta=26.4$ degree, 44.4 degree, etc. for carbon (C) as the substrate, and at $2^\theta=14.6$ degree, 27.8 degree, etc. for boron oxide.

Thus, it is seen that when the heat treatment of this invention was not performed, the boron carbide film contained boron oxide.

On the other hand, when the heat treatment of this invention was performed for the boron carbide film, it is seen that as the temperature of the heat treatment was increased, the peaks attributable to the boron oxide decreased, while the peaks of the boron carbide increased.

That is, since the intensities of the peaks attributable to boron carbide increased, the crystallinity became higher. On the contrary, the intensities of the peaks attributable to boron oxide decreased.

Therefore, apparent from FIG. 3, the boron oxide remains if the temperature of the heat treatment is lower than the range defined in this invention, but it almost vanished when the temperature reached 1100° C. and over in the heat treatment temperature of this invention.

FIG. 4 is an electron microscope photograph of a fractured surface of a boron carbide film formed by a conventional method of manufacturing a boron carbide film.

FIG. 5 is an electron microscope photograph of a fractured surface of a boron carbide film formed by a method of forming a boron carbide film in this invention.

Apparent from FIG. 4, it is seen in the boron carbide film formed by the conventional manufacturing method that the liquid particles covered with boron oxide are knocked against the substrate, and are stacked on the substrate in a scaly or particulate fashion.

Meanwhile apparent from FIG. 5, it is seen in the boron carbide film formed by the manufacturing method according to this invention that the boron oxide vanishes, and the film becomes a homogeneous boron carbide film.

This invention is described in more detail with reference to following specific examples.

EXAMPLE 1~3 AND COMPARATIVE EXAMPLE 1~2

A film of boron carbide was formed in a thickness of 100 μm on a carbon substrate with a coefficient of thermal expansion of $6\times10^{-6}$/degree (in a range of room temperature to 1000° C.), 40 mm in diameter and 50 mm in thickness, from a mixed starting material of 5 weight % carbon powder having the average particle diameter of 1 μm and 95 weight % boron carbide having the average particle diameter of 20 μm, by atmospheric plasma spraying.

Next the substrate formed with the boron carbide film was set in a high temperature controlled atmosphere furnace, and after the furnace was evacuated to vacuum, its interior was replaced by Ar gas.

Subsequently the substrate was heated, at a heating rate of 3 degrees/min, up to the temperature shown in Table 1, and then it was held for 1 hour at the temperature.

After the heat treatment, the substrate was cooled down to not more than 200° C. in the furnace, and taken out of the furnace. Afterward the existence of boron oxide was observed by X ray diffraction and the occurrence of cracks was investigated by humidity test.

COMPARATIVE EXAMPLE 3

Except that in the heat treatment after forming a boron carbide film, a mixed oxidation gas of 5 weight % oxygen ($O_2$) and 95 weight % Ar was used and the temperature was 1600° C., this example was performed as the above Examples and Comparative Examples.

The existence of the boron oxide and the occurrence of cracks were investigated as in the above examples. The results are shown in Table 1.

TABLE 1

|  | Heat treatment atmosphere | Temperature of heat treatment (° C.) | Boron oxide | Occurence of cracks |
| --- | --- | --- | --- | --- |
| Example 1 | non-oxidative | 1100 | not contained | not cracked |
| Example 2 | non-oxidative | 1600 | not contained | not cracked |
| Example 3 | non-oxidative | 2300 | not contained | not cracked |
| Comparative Example 1 | non-oxidative | —(*) | contained | cracked |
| Comparative Example 2 | non-oxidative | 1000 | contained | cracked |
| Comparative Example 3 | non-oxidative | 1600 | contained | cracked |

The mark (*) shows a state in which heat treatment is not carried out.

EXAMPLE 4~5 AND COMPARATIVE EXAMPLE 4

As a substrate, an gas-tight silicon-silicon carbide composite with a coefficient of thermal expansion of $5\times10^{-6}$/degree and 40 mm in diameter, 50 mm in thickness, which was formed by impregnating silicon into porous silicon carbide, was used and the temperature of the heat treatment shown in Table 2 was used. The other condition were performed as in the above Examples and Comparative Examples.

The existence of the boron oxide and the occurrence of cracks were investigated as in the above Examples and Comparative Examples. The results are shown in Table 2.

TABLE 2

|  | Heat treatment atmosphere | Temperature of heat treatment (° C.) | Boron oxide | Occurence of cracks |
| --- | --- | --- | --- | --- |
| Example 4 | non-oxidative | 1100 | not contained | not cracked |
| Example 3 | non-oxidative | 1400 | not contained | not cracked |
| Comparative Example | non-oxidative | 1000 | contained | cracked |

Apparent from the Examples in Tables 1 and 2, the boron carbide film formed by the manufacturing method according to this invention does not have boron oxide. Moreover it is confirmed by a fluorescent penetration inspection after the humidity test that the lack of the boron oxide can prevent cracks from occurring. (0034)

As shown in Comparative Example 1, 2, and 4, different from the method of manufacturing a boron carbide film of this invention, in the case without the heat treatment or in the cases of the temperature of the heat treatment below the range of the this invention, the boron carbide film has the boron oxide, which caused the cracks to occur.

As shown in Comparative Example 3, in the case that the heat treatment was carried out within the temperature range according to the present invention but in oxidation atmosphere, different from the present invention, the boron carbide film has boron oxide and cracked.

As above mentioned, the manufacturing method according to the present invention enables the boron carbide film to be manufactured without boron oxide causing the occurrence of the cracks therein and the peeling-off of it from the substrate.

What is claimed is:

1. A method of removing boron oxide formed in a plasma sprayed film of boron carbide, comprising the steps of forming a film of boron carbide on a surface of a substrate by plasma spraying in an oxygen containing atmosphere and removing substantially all boron oxide from the plasma sprayed film by heating the film in an inert atmosphere at 1100°~2400° C.

2. The method of claim 1, wherein the film is heated in an inert atmosphere for 1 to 10 hours.

3. The method of claim 1, wherein the thermal expansion coefficient of the substrate is $4.5 \times 10^{-6}$~$7 \times 10^{-6}$/degree.

4. The method of claim 3, wherein the substrate comprises at least one of carbon, recrystallized silicon carbide, and a silicon-silicon carbide composite material.

5. The method of claim 4, wherein the heating temperature is 1300~1600° C.

6. The method of claim 3, wherein the heating temperature is 1300~1600° C.

7. The method of claim 1, wherein the heating temperature is 1300~1600° C.

* * * * *